United States Patent
Geidl et al.

(10) Patent No.: US 11,868,609 B2
(45) Date of Patent: Jan. 9, 2024

(54) DYNAMIC SOFT KEYBOARD

(71) Applicant: Microsoft Technology Licensing, LLC, Redmond, WA (US)

(72) Inventors: Erik M. Geidl, Moscow, ID (US); Shawn R. LeProwse, Mercer Island, WA (US); Ian C. LeGrow, Redmond, WA (US); Reed L. Townsend, Kirkland, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/858,983

(22) Filed: Jul. 6, 2022

(65) Prior Publication Data
US 2022/0342539 A1 Oct. 27, 2022

Related U.S. Application Data

(63) Continuation of application No. 17/534,424, filed on Nov. 23, 2021, now Pat. No. 11,416,142, which is a continuation of application No. 16/422,672, filed on May 24, 2019, now Pat. No. 11,199,966, which is a continuation of application No. 15/375,830, filed on Dec. 12, 2016, now Pat. No. 10,394,446, which is a continuation of application No. 12/025,721, filed on Feb. 4, 2008, now Pat. No. 9,552,155.

(51) Int. Cl.
| | | |
|---|---|---|
| G06F 3/0482 | (2013.01) | |
| G06F 3/04886 | (2022.01) | |
| G06F 3/023 | (2006.01) | |
| G06F 3/04845 | (2022.01) | |
| G06F 3/0484 | (2022.01) | |
| G06F 3/042 | (2006.01) | |
| G06F 3/0346 | (2013.01) | |

(52) U.S. Cl.
CPC ........ *G06F 3/04886* (2013.01); *G06F 3/0237* (2013.01); *G06F 3/0482* (2013.01); *G06F 3/04845* (2013.01); *G06F 3/0346* (2013.01); *G06F 3/0426* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 5,963,671 A | * | 10/1999 | Comerford | G06V 30/268 382/230 |
| 6,573,844 B1 | * | 6/2003 | Venolia | G06F 3/0237 382/229 |
| 2002/0167545 A1 | * | 11/2002 | Kang | G06F 3/04895 715/780 |
| 2005/0270270 A1 | * | 12/2005 | Chadha | G06F 3/0237 345/157 |

(Continued)

*Primary Examiner* — Rinna Yi
(74) *Attorney, Agent, or Firm* — Barta, Jones & Foley, PLLC

(57) ABSTRACT

In accordance with one or more aspects of a dynamic soft keyboard, a user input is received via a soft keyboard having multiple keys. Information describing a current input environment for the soft keyboard is obtained, and a determination is made as to which one or more keys of the multiple keys was intended to be selected by the user input. This determination is made based at least in part on the current input environment.

20 Claims, 5 Drawing Sheets

(56) References Cited

U.S. PATENT DOCUMENTS

| | | | |
|---|---|---|---|
| 2007/0046641 A1* | 3/2007 | Lim | G06F 3/0237 |
| | | | 345/173 |
| 2007/0074131 A1* | 3/2007 | Assadollahi | G06F 40/242 |
| | | | 715/236 |
| 2008/0115078 A1* | 5/2008 | Girgaonkar | G06F 3/0489 |
| | | | 715/773 |
| 2009/0051661 A1* | 2/2009 | Kraft | G06F 3/04886 |
| | | | 345/173 |
| 2009/0303187 A1* | 12/2009 | Pallakoff | G06F 3/04886 |
| | | | 345/169 |

* cited by examiner

DYNAMIC SOFT KEYBOARD

RELATED APPLICATIONS

This application is a continuation of and claims priority to U.S. patent application Ser. No. 17/534,424 filed on Nov. 23, 2021, entitled "Dynamic Soft Keyboard" which is a continuation of and claims priority to U.S. patent application Ser. No. 16/422,672, filed on May 24, 2019, entitled "Dynamic Soft Keyboard" (now patent application Ser. No. 11/199,966, issued Dec. 14, 2021), which is a continuation of and claims priority to U.S. patent application Ser. No. 15/375,830, filed Dec. 12, 2016, entitled "Dynamic Soft Keyboard" (now patent application Ser. No. 10/394,446, issued Aug. 27, 2019), which is a continuation of and claims priority to U.S. patent application Ser. No. 12/025,721, filed Feb. 4, 2008, entitled "Dynamic Soft Keyboard" (now U.S. Pat. No. 9,552,155, issued Jan. 24, 2017), the disclosures of which are hereby incorporated by reference herein in their entireties.

BACKGROUND

Many different types of mobile computing devices are currently available, typically providing a large amount of computing power in a small package. One challenge faced by mobile devices, however, is data entry. Users are accustomed to entering data via keyboards which can be large and cumbersome, oftentimes larger than the mobile computing device itself. Some mobile computing devices solve this problem by using a soft keyboard, which is a keyboard displayed on a display of the mobile device and which allows the user to select the keys that are displayed (e.g., using a stylus, the user's finger, etc.). Unfortunately, due to the lack of physically separate keys and the frequently small size of soft keyboards, it remains difficult for users to select keys on soft keyboards.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A dynamic soft keyboard is discussed herein. In accordance with one or more aspects, a user input is received via a soft keyboard, the soft keyboard including multiple keys. Information describing a current input environment for the soft keyboard is obtained, and a determination is made as to which one or more keys of the multiple keys was intended to be selected by the user input. This determination is made based at least in part on the current input environment.

BRIEF DESCRIPTION OF THE DRAWINGS

The same numbers are used throughout the drawings to reference like features.

DETAILED DESCRIPTION

A dynamic soft keyboard is discussed herein. A soft keyboard user interface is displayed to a user. Various information describing the current input environment for the soft keyboard user interface is also obtained. This information describing the current input environment can include, for example, information describing a current type of data being entered by the user (e.g., an email address, a zip code, a city, etc.), information describing a language typically used by the user, data commonly entered by the user, the physical operating environment (e.g., on a desk, in motion walking, in a moving car, etc.), the characters and/or words near a data input field, and so forth. This information describing the current user input environment is used to detect which key(s) of the soft keyboard was intended to be selected by the user when a user input is received. The dynamic soft keyboard can thus aid user input speed and user satisfaction.

Figure 1:
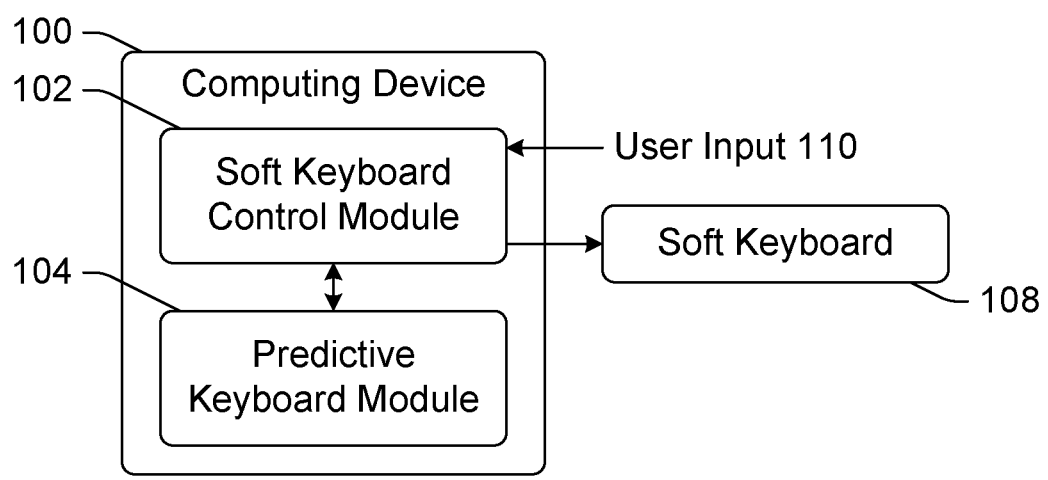
FIG. 1 is a block diagram illustrating an example computing device implementing the dynamic soft keyboard in accordance with one or more embodiments.

FIG. 1 is a block diagram illustrating an example computing device 100 implementing the dynamic soft keyboard in accordance with one or more embodiments. Computing device 100 can be any of a variety of different devices. For example, computing device 100 can be a desktop computer, a mobile station, an entertainment appliance, a set-top box communicatively coupled to a display device, a television, a wireless phone, a digital camera, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes a soft keyboard control module 102 and a predictive keyboard module 104. Soft keyboard control module 102 generates a soft keyboard 108 for display to a user. Soft keyboard 108 is a user interface displayed on a display device. Soft keyboard 108 includes multiple keys that can be selected by a user as discussed in more detail below. Computing device 100 can include a display component via which soft keyboard 108 can be displayed, or alternatively can output a signal or data to another device or component via which soft keyboard 108 can be displayed.

Soft keyboard 108 includes multiple keys that can be arranged in any of a variety of different layouts and that can correspond to any of a variety of different alphanumeric characters, kanji symbols, character or word groups (e.g., "http://", "www.", and so forth), other symbols, and so forth. One example layout for the keys is a QWERTY layout, although other layouts can alternatively be provided. Additionally, soft keyboard 108 is dynamic. This dynamic nature refers to the behavior of predictive keyboard module 104 changing over time and/or the user interface displayed as soft keyboard 108 changing over time. As discussed in more detail below, this changing can include a changing of the layout of the keyboard, a change in the different alphanumeric characters or symbols corresponding to the keys, a change in which locations on soft keyboard 108 correspond to which keys, a change in hit target logic, and so forth.

Soft keyboard 108 is displayed on a display device and user inputs are entered via this display device as well. In one or more embodiments, the display device displaying soft keyboard 108 is, or incorporates, a touch screen or touchpad via which user inputs can be entered by the user touching, or coming in close physical proximity to, the areas of the display device that display the keys of soft keyboard 108. This touching or close physical proximity can be made using a stylus, pen, finger, and so forth. In other embodiments, other pointing devices are used rather than a touch screen or touchpad. Any of a variety of other pointing devices can be used to navigate a pointer and enter inputs using soft keyboard 108, including relative pointing devices such as a mouse, thumbstick, trackpad, trackball, and so forth. Other types of pointing devices can also be used, including absolute disconnected pointing devices such as pen tablets. These various pointing devices typically include one or more buttons or other selection mechanism(s) that can be actuated by the user to select a particular location of soft keyboard 108 (e.g., the user can press a mouse button when a pointer is located over the desired area of soft keyboard 108). There need not be any separate physical keyboard with physical keys that correspond to soft keyboard 108 via which user inputs are entered.

Figure 2:
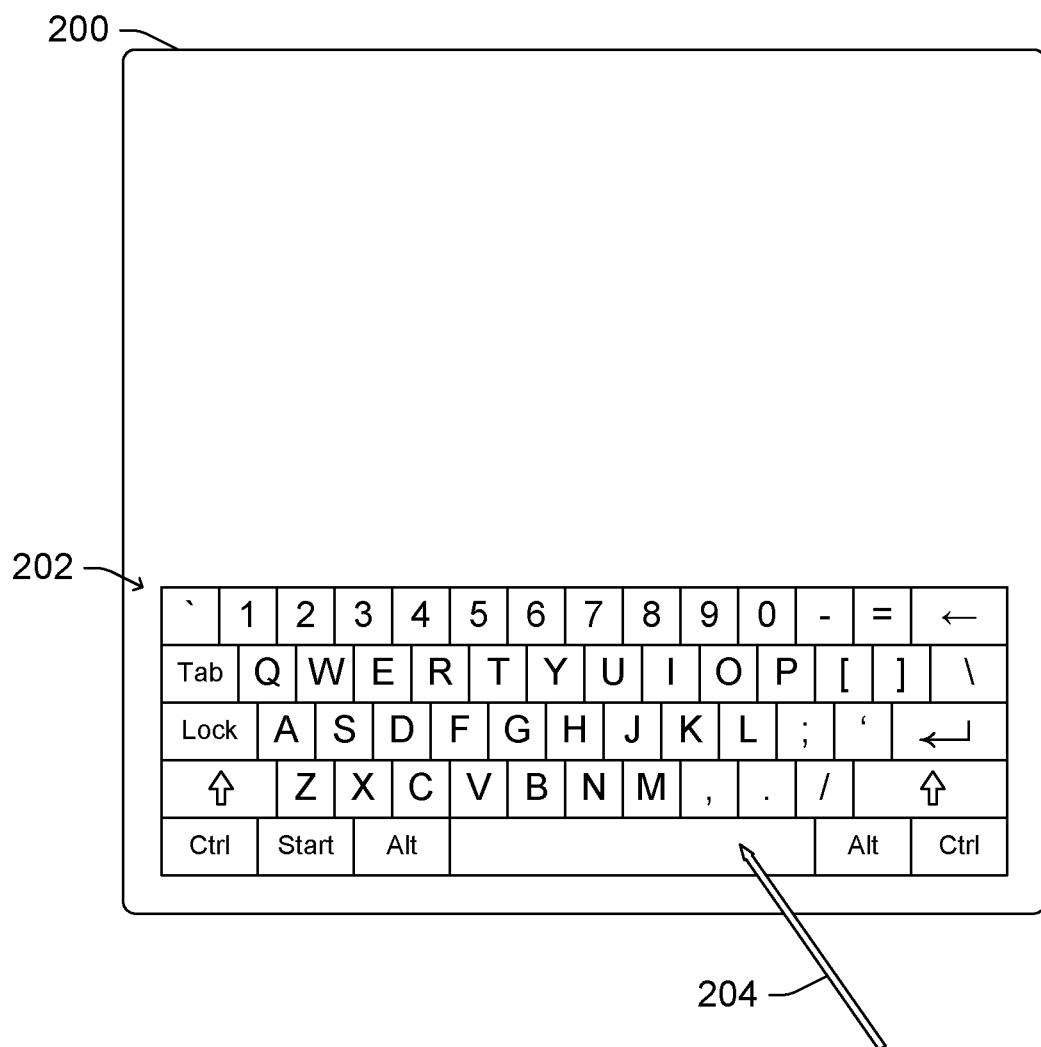
FIG. 2 illustrates an example display device displaying a soft keyboard in accordance with one or more embodiments.

FIG. 2 illustrates an example display device 200 displaying a soft keyboard 202 in accordance with one or more embodiments. Soft keyboard 202 can be, for example, soft keyboard 108 of FIG. 1. It is to be appreciated that the example layout and alphanumeric characters corresponding to the keys of soft keyboard 202 are only an example, and that any of a variety of different layouts and/or corresponding characters or symbols can be used as discussed above. In the example of FIG. 2, soft keyboard 202 does not occupy all of the display area of display device 200, leaving room for other information to be displayed to the user of device 200. Alternatively, soft keyboard 202 can occupy all, or almost all, of the display area of display device 200. Soft keyboard 202 can also optionally include a user interface mechanism for hide and show functionality, allowing keyboard 202 to be hidden from view at certain times.

As discussed above, any of a variety of different pointing devices can be used to enter inputs on soft keyboard 202. As an example of a pointing device, FIG. 2 illustrates a stylus 204 which the user can use to touch, or hover over, a particular key of keyboard 202. When the user touches a particular area of keyboard 202 (with stylus 204 or a pointer controlled by another pointing device), or moves stylus 204 (or other pointer) over a particular area of keyboard 202, the particular key that the user intended to select by the touching or movement of the stylus or other pointing device is automatically detected. The manner in which this automatic detection is performed is based at least in part on a current input environment, as discussed in more detail below.

In one or more embodiments, display device 200 includes a touch screen or touchpad allowing the user to touch, or move a stylus close to, different areas of display device 200 to allow the user to enter a user input. Such a touch screen or touchpad can be an electromagnetic input device, a capacitive input device, a resistive input device, a surface acoustic wave input device, an optical imaging input device, and so forth. Such touch screens or touchpads are well-known to those skilled in the art. It is to be appreciated that if other pointing devices are used (such as a mouse, pen tablet, etc.), then display device 200 need not include a touch screen or touchpad.

Returning to FIG. 1, soft keyboard control module 102 also receives user input 110. User input 110 refers to the selection of a particular location(s) of soft keyboard 108. This selection can be made using a stylus, pen, finger, pointer controlled by a pointing device, and so forth as discussed above. The user input 110 is typically represented by module 102 as a set of one or more coordinates (e.g., X-Y coordinates, X-Y-Z coordinates, etc.) identifying the location(s) of soft keyboard 108 that were selected by the user. As discussed above, this selection can include the touching, or moving in close proximity to, a touch screen or touchpad, or other inputs from other pointing devices. The X and Y coordinates refer to the horizontal and vertical locations, respectively, of the input surface (e.g., the surface of a touch screen, touchpad, pen tablet, and so forth). The Z coordinate represents the distance from the input surface, and can be used to determine whether a user is hovering over a portion of the input surface.

In one or more embodiments, user input 110 is a stream of data (e.g., a stream of X-Y coordinates, a stream of X-Y-Z coordinates, etc.). This stream of data includes one or more of an incoming trajectory, one or more pen-down trajectories, and an outgoing trajectory. The incoming trajectory refers to a stream of coordinates before the pointing device hits the surface (or before the selection mechanism is actuated by the user). A pen-down trajectory refers to a location on the surface that the pointing device hits (or that the pointer is located at when the selection mechanism is actuated by the user). Oftentimes there is a single pen-down trajectory, although multiple pen-down trajectories can be received (e.g., if the user bounces the pen as it hits the surface). The outgoing trajectory refers to a stream of coordinates as the pointing device leaves the surface (or after the selection mechanism is actuated by the user).

Predictive keyboard module 104 receives user input 110 from soft keyboard control module 102. Predictive keyboard module 104 determines, based on both user input 110 and information describing the current input environment for soft keyboard 108, which one or more keys of soft keyboard 108 the user intended to select with user input 110. As discussed in more detail below, this current input environment describes various aspects of the environment in which soft keyboard 108 is displayed, such as a current type of data being entered by the user (e.g., an email address, a zip code, a city, etc.), a language typically used by the user of soft keyboard 108, data commonly entered by the user of soft keyboard 108, and so forth.

In one or more embodiments predictive keyboard module 104 also determines, based on user input 110 and/or information describing the current input environment for soft keyboard 108, changes to make to soft keyboard 108. These changes can be a change in layout of the keyboard and/or a change in the different alphanumeric characters or symbols corresponding to the keys, as discussed in more detail below.

Figure 3:
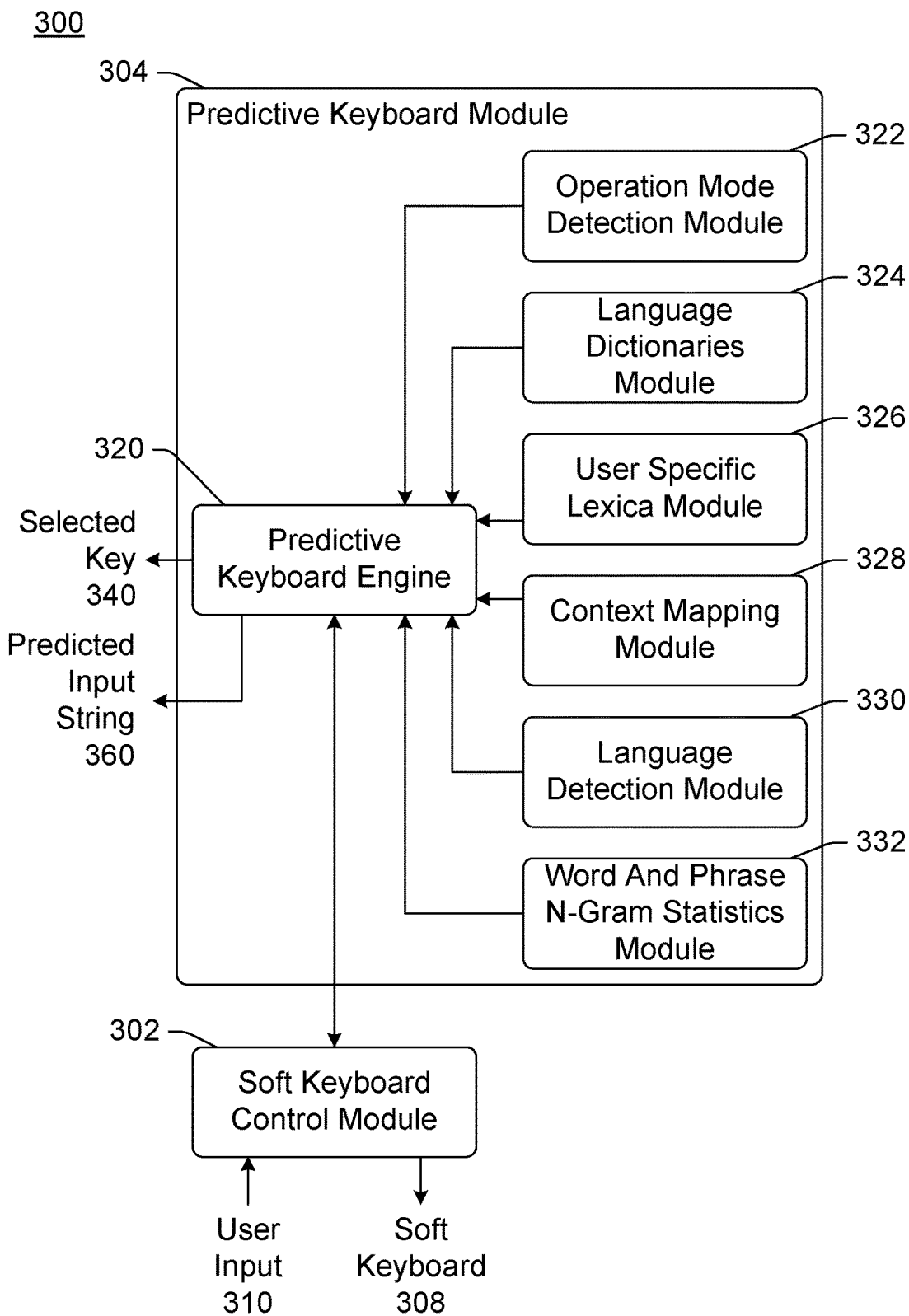
FIG. 3 illustrates an example system implementing the dynamic soft keyboard in accordance with one or more embodiments.

FIG. 3 illustrates an example system implementing the dynamic soft keyboard in accordance with one or more embodiments. System 300 can be, for example, computing device 100 of FIG. 1. System 300 includes a soft keyboard control module 302 (which can be soft keyboard control module 102 of FIG. 1), and a predictive keyboard module 304 (which can be predictive keyboard module 104 of FIG. 1). Modules 302 and 304 can be implemented as part of the same device or alternatively can be implemented by different devices. Additionally, each of modules 302 and 304 themselves can be implemented by a single device or alternatively multiple devices.

Soft keyboard control module 302 generates a soft keyboard 308 and receives user input 310 (analogous to soft keyboard 108 and user input 110 of FIG. 1). User input 310 is a selection made by a user of soft keyboard 308, the selection being a selection of a particular one or more locations of soft keyboard 308. This selection can be made in different manners, such as by touching the display device with a finger, pen, stylus, etc., by moving a pointer over a location of the soft keyboard, by moving a pen or stylus close to the display device, and so forth. This selection includes one or more of an incoming trajectory, one or more pen-down trajectories, and an outgoing trajectory as discussed above. Soft keyboard control module 302 can represent user input 310 in any of a variety of different manners.

In one or more embodiments, user input 310 is represented as a set of one or more X-Y coordinates. The set of X-Y coordinates identify a particular location of soft keyboard 308 in a 2-dimensional space. A particular location of soft keyboard 308 is determined to be the origin (e.g., the lower-left corner of soft keyboard 308, the center of soft keyboard 308, etc.), and the X-Y values represent locations along the X axis and the Y axis relative to the origin.

Additionally, in one or more embodiments the display device on which soft keyboard 308 is displayed supports a Z axis. This Z axis is perpendicular to the 2-dimensional space of the X-Y coordinates. Such display devices can detect, for example, a stylus positioned close to but not touching the display device. The distance between the stylus and the display device is recorded as a Z value. Thus, when used with such display devices, user input 310 is represented as a set of one or more X-Y-Z coordinates.

Additionally, in one or more embodiments an additional time value T is recorded for the user input. The time value T refers to the duration of the user's selection, such as an amount of time that the user's stylus was touching a particular X-Y location of keyboard 308, an amount of time that the user's stylus was held a particular distance Z from a particular X-Y location of keyboard 308, the amount of time that a pointer was held over (hovered over) a particular X-Y location of keyboard 308, and so forth. Thus, in such embodiments user input 310 is represented as a set of one or more X-Y-T, or alternatively X-Y-Z-T, coordinates. The time value T is an input into predictive keyboard engine 320, and can be used to make better predictions for the text input desired by the user as discussed in more detail below.

Furthermore, in one or more embodiments, multiple locations of keyboard 308 can be selected concurrently. These multiple locations could be, for example, two or more locations selected simultaneously (e.g., using two fingers), such as the "Shift" key plus a letter key, the "Control" key plus a letter key, and so forth. These multiple locations could also be movement from one location to another (e.g., touch keyboard 308 with a stylus at one location, slide the stylus across the display device, and then lift up the stylus at another location), and so forth. In such situations, user input 310 is represented as a set of multiple coordinates (e.g., X-Y, X-Y-Z, X-Y-T, X-Y-Z-T, etc.). One or more coordinates optionally also includes a trajectory parameter that identifies a direction in which the stylus (or finger, pen, etc.) is being moved along the display device, either when in contact with the display device or located close to the display device (e.g., a distance Z from the display device). In some embodiments, given current hardware, users typically have more errors in targeting in the vertical direction and are more precise in the horizontal direction.

Predictive keyboard module 304 receives user input 310 from soft keyboard control module 302 and determines, based on both user input 310 and information describing the current input environment for soft keyboard 308, which one or more keys of soft keyboard 308 the user intended to select with user input 310. In one or more embodiments predictive keyboard module 304 also determines changes to make to soft keyboard 308 based at least in part on the current input environment. An indication of these changes is sent to soft keyboard control module 302, which changes the display of soft keyboard 308 accordingly.

Predictive keyboard module 304 includes a predictive keyboard engine 320, an operation mode detection module 322, a language dictionaries module 324, a user specific lexica module 326, a context mapping module 328, a language detection module 330, and a word and phrase n-gram statistics module 332. Each of modules 322-332 provides, to predictive keyboard engine 320, various information regarding the current input environment for soft keyboard 308. Predictive keyboard engine 320 in turn uses this information regarding the current input environment to change soft keyboard 308 (e.g., the layout or the characters or symbols corresponding to particular keys), and also to determine which one or more keys of soft keyboard 308 the user intended to select with user input 310.

Predictive keyboard engine 320 outputs an indication 340 of which key a user intended to select with a particular user input. This indication 340 is typically used to update the user interface of soft keyboard 308, and can also be provided to another component (not shown) for utilization as a character (s) entry. This indication 340 can also be returned to one or more of modules 322-332 to assist in determining the current input environment. For example, as discussed in more detail below, user specific lexica module 326 can monitor words that are input by the user.

Additionally, in one or more embodiments predictive keyboard engine 340 also outputs a predicted input string 360 which is a prediction by engine 340 of a particular word or phrase that the user is inputting. Outputting this predication allows the user to select an "autocomplete" option where the predicted word or phrase is input without the user needing to enter any more characters of the word or phrase. The predicted input string 360 is provided to soft keyboard control module 302 or alternatively another component of system (not shown) so that the predicted word or phrase can be displayed to the user. The user can select this displayed predicted word or phrase in different manners via soft keyboard 308, such as by selecting an "enter" key, by selecting an "autocomplete" key, by selecting a particular character in the predicted word or phrase, and so forth. It should be noted that the user can also optionally select only a portion of the predicted word or phrase.

Operation mode detection module 322 detects the operation mode of the device on which soft keyboard 308 is being displayed. The operation mode can include, for example, the physical situation and/or geographical location of the device. The physical situation refers to a physical description of how the device is being used. This physical description can include, for example, whether the device is stationary or moving, whether the device is oriented in a particular direction, and so forth. The physical situation can be determined in different manners, such as being specified by a user of the device, using motion sensors in the device, based on peripheral devices or other components that the device is coupled to, based on communications with a wireless base or access point, and so forth.

The geographic location refers to a geographic description of where the device is located. The geographic location can be determined in different manners, such as being specified by a user of the device, using a global positioning system (GPS) of the device, based on an address (e.g., Internet protocol (IP) address) assigned to the device, and so forth.

The information describing the operation mode of the device from operation mode detection module 322 can be used by predictive keyboard engine 320 in a variety of different manners. For example, predictive keyboard engine 320 may assume that it is more difficult to accurately identify a particular key when a device is moving rather than stationary, so engine 320 may assign larger areas of soft keyboard 308 to particular keys when the device is moving rather than when the device is stationary. These larger areas could corresponding to larger keys being displayed on soft keyboard 308, or larger hit targets for particular keys as discussed in more detail below.

Language dictionaries module 324 makes one or more language-specific dictionaries available to predictive keyboard engine 320. Predictive keyboard engine 320 can automatically attempt to identify particular words or phrases that are being input by a user so that a next character (or other symbol) that is likely to be input by the user can be determined. For example, if the user enters "uni", predictive keyboard engine 320 may automatically identify that the user is attempting to enter the word "united", so the next character input by the user is likely to be the letter "t". Predictive keyboard engine 320 can use various information from different modules 322-332 to attempt to identify particular words or phrases that are being input by a user, one of which is the specific language typically being used by the user. One piece of information provided to predictive keyboard engine 320 by language dictionaries module 324 to assist in making this determination is a dictionary of words and/or phrases for the language(s) typically being used by the user.

The language(s) typically being used by the user can be identified in different manners. For example, the language(s) can be specified by the user, can be a default language based on a location where system 300 is sold (e.g., if system 300 was sold in France, then the default language would be French), can be based on previous inputs by the user (e.g., if the majority of previous inputs were in English, then the language would be English), can be obtained from another module (such as language detection module 330 discussed in more detail below), and so forth.

User specific lexica module 326 gathers and maintains information regarding words (or other data, such as numbers, symbols, etc.) that are commonly entered by a user. This information can be gathered and maintained in a variety of different manners. In one or more embodiments, words entered by the user and a corresponding frequency indicating how often those words are entered is maintained. This frequency can be, for example, a word count that is incremented every time the word is entered, a ratio indicating how often the word occurs relative to other words maintained by module 326, and so forth. Additionally, a user or administrator (e.g., for a corporation the user works for) can optionally install a new custom dictionary adding their words as they are input by the user (and/or optionally including default words and frequencies for the user).

Furthermore, the words that are tracked or maintained by module 326 can be aged over time, so that words used with the same frequency but longer ago are identified as less commonly used by the user than words that were entered more recently. This aging can be performed in different manners, such as by maintaining a record of how long ago a particular word was used (e.g., in minutes, hours, days, etc.), by altering (e.g., decreasing) the frequency corresponding to a word that has not been used for at least a threshold amount of time, and so forth.

As discussed above, predictive keyboard engine 320 can automatically attempt to identify particular words or phrases that are being input by a user. One piece of information provided to predictive keyboard engine 320 by user specific lexica module 326 is the information regarding words (or other data) that are commonly entered by the user.

Context mapping module 328 maintains a mapping of particular fields in which a user may enter data to types of data that are valid for each particular field. For example, if the field is a zip code field then the valid data could be numbers but not letters. By way of another example, if the field is an email address field, then the valid data could be letters, numbers, and some symbols (such as "@"), but not other symbols (such as "!" or "#").

Context mapping module 328 can identify particular fields being displayed to a user along with soft keyboard 308 in any of a variety of different manners. For example, the data being displayed on the screen can be analyzed and certain fields identified (e.g., a field with a label of "zip" or "zip code", a field with a label of "email" or "email address", and so forth). By way of another example, various tags or identifiers can be included in the data being displayed along with soft keyboard 308, these tags or identifiers indicating to context mapping module 328 the particular fields being displayed. By way of another example, input fields can explicitly declare their existence as well as their "type" or legal input restrictions via an operating system application programming interface (API) on system 300.

The valid types of data for particular fields can be identified in different manners. In one or more embodiments, the valid types of data for particular fields are pre-programmed in or otherwise identified to context mapping module 328. For example, various tags, identifiers, or other metadata corresponding to data being displayed along with soft keyboard can identify the valid types of data for particular fields, or other remote devices can be accessed to obtain the valid types of data for particular fields. By way of another example, an operating system API on system 300 can be invoked to obtain the valid types of data for particular fields. In other embodiments, one or more valid types of data for particular fields can be automatically identified by context mapping module 328. For example, context mapping module 328 can learn that a particular type of data is not valid for a particular field if the user attempts to enter data of that type and an error is returned to the user by a program or other component processing the input.

The context mapping information from context mapping module 328 can be used by predictive keyboard engine 320 in any of a variety of different manners. In one or more embodiments, predictive keyboard engine 320 determines that particular types of data that are not valid for a particular field are not intended to be selected with user input 310. For example, if the particular field accepts only numbers, then predictive keyboard engine 302 can determine that the key that a user intended to select would be a number key on soft keyboard 308 that is closest to user input 310. By way of another example, if the particular field accepts only numbers, then predictive keyboard engine 320 can indicate to soft keyboard control module 302 that soft keyboard 308 is to include only numbers and no letters.

Alternatively, predictive keyboard engine 320 can determine that particular types of data that are valid are to be easier for the user to select than other types of data. For example, if the symbol "A" is a valid symbol for a particular field but the symbols "!" and "#" are not valid symbols for that field, then hit target logic implemented by predictive keyboard engine 320 can increase the likelihood that the "A"

symbol is selected. This likelihood can be increased in different manners, such as by making a hit target for the "A" symbol larger than for the "!" and "#" symbols. The hit target on soft keyboard 308 for a particular key refers to the locations of soft keyboard 308 that correspond to that particular key. As the "!" and "#" symbols are on either side of the "A" symbol on many keyboards, altering the hit target size makes it easier for the user to select the "A" symbol by touching soft keyboard 308 on or close to the "A" symbol. The use of hit targets and hit target logic implemented by predictive keyboard engine 320 is are discussed in more detail below.

Language detection module 330 identifies the language being used by the user of system 300. The language can be identified in different manners, such as the user specifying the language, or module 330 automatically identifying the language. Module 330 can automatically identify the language by, for example, accessing a default language for system 300 (e.g., as recorded by an operating system), accessing context mapping module 328 to identify types of data and their corresponding language (e.g., if kanji symbols are the valid type of data, then the language can be automatically identified as Japanese), and so forth.

The language identified by language detection module 330 can be the language typically used by the user of system 300, or alternatively can be the language used by the user of system 300 for a particular entry being made by the user. For example, if the user has entered a partial word (e.g., "uni"), then language detection module 330 can automatically detect a language being entered by the user. This can be a stand-alone detection (e.g., based only on the partial word), or alternatively can be in conjunction with other information (e.g., the language(s) typically used by the user of system 300).

Word and phrase n-gram statistics module 332 identifies words or phrases that are more likely than others based on partial inputs. This can include, for example, identification of a word based on a partial word input, and identification of a phrase based on a single (or multiple) word input. In one or more embodiments, this identification is based on actual words (e.g., from a dictionary supplied by language dictionaries module 324). For example, if the word "united" is entered then module 332 can indicate that a word "states" is more likely than a word "run".

In other embodiments, this identification by module 332 is based on grammar rules or other rules. For example, two verbs are typically not adjacent one another, so if a verb is entered as a first word then module 332 can indicate that the next word in the phrase is not likely to be a verb. By way of another example, module 332 can determine that a phrase "United States of America" is often entered by the user of system 300, so module 332 can determine that if "United States" has been entered by the user then "of America" is more likely next in the phrase than other word combinations.

The information identifying likely words or phrases from word and phrase n-gram statistics module 332 can be used by predictive keyboard engine 320 in any of a variety of different manners. Analogous to the discussion above regarding context mapping module 328, the information identifying likely words or phrases can be used to determine that particular words, letters, or other symbols are not intended to be selected with user input 310 and thus disallow entry of such words, letters, or other symbols, or alternatively can alter hit targets making it easier for the user to select particular words, letters, or other symbols.

Predictive keyboard engine 320 receives information describing the current input environment from the various modules 322-332 as discussed above. Predictive keyboard engine 320 uses this information describing the current input environment to change the layout and/or alphanumeric characters or symbols corresponding to the keys of soft keyboard 308, and/or to determine which key a user intended to select with a particular user input. Predictive keyboard engine 320 repeats this changing and/or determination after each selection of a key(s) is made by the user. The current input environment can change after every selection of a key(s) by the user, and the new current input environment can be taken into account by predictive keyboard engine 320 after every selection of a key(s) by the user.

As discussed above, the information describing the current input environment can indicate that certain inputs are more likely than others. In one or more embodiments, this information is used to change the layout of soft keyboard 308. For example, the information can be used to change the layout of soft keyboard 308 from a QWERTY layout to a numeric pad layout, to include only certain keys from the QWERTY layout, and so forth.

In other embodiments, the information describing the current input environment is used to change which alphanumeric characters or other symbols correspond to the keys of soft keyboard 308. In response to such a change, soft keyboard 308 displays the new corresponding characters or symbols for those keys rather than the previously displayed characters or symbols, and selection of one of those keys results in a user input of the displayed corresponding character or symbol. For example, a row of keys of soft keyboard 308 may be changed from corresponding to numbers to corresponding to symbols. By way of another example, certain keys may be changed to correspond to certain language-specific characters and/or symbols.

In other embodiments, the information describing the current input environment is used to change the faces of keys of soft keyboard 308. In response to such a change, soft keyboard 308 displays different faces for keys. For example, keys that are likely and/or possible future letters of words that are being entered can be highlighted. By way of another example, keys for letters that would not result in a word (based on letters already entered) could be dimmed to aid in visual targeting and reduce user effort.

In other embodiments, the information describing the current input environment is used to determine which key a user intended to select with a particular user input. Predictive keyboard engine 320, including a hit target logic, uses the current input environment along with user input 310 to identify which particular key on soft keyboard 308 the user intended to select.

One way in which predictive keyboard engine can use the current input environment and user input 310 is to alter the sizes of hit targets for particular keys. As discussed above, each key on soft keyboard 308 can have a corresponding hit target and predictive keyboard engine 320 can assign the hit target to each key. This hit target for a particular key refers to the locations on soft keyboard 308 that correspond to that particular key. The hit target for a particular key can be altered—the hit target can be increased in size by predictive keyboard engine 320 so that more locations on soft keyboard 308 correspond to that particular key, or can be decreased in size by predictive keyboard engine 320 so that fewer locations on soft keyboard 308 correspond to that particular key. Increasing the hit target for a key thus typically makes it easier for the user to select that key, while decreasing the hit target for a key typically makes it more difficult for the user to select that key.

It should be noted that this can result in situations where the hit target for one key is larger than an adjacent key, and actually extends over a portion of the display of the adjacent key. For example, assume that predictive keyboard engine 320 determines that a letter "d" is likely to be the next character input by the user. The hit target for the letter "d" can be increased while the hit target for an adjacent letter "f" can be decreased. The hit target for the letter "d" can include locations in which the key for the letter "f" is actually displayed on soft keyboard 308. Thus, in this example if the user were to press the location at the edge of the key for the letter "f", predictive keyboard engine 320 determines that the letter "d" is the key that was intended to be selected by the user. Such situations can occur for a variety of different reasons, such as if the user is walking while making inputs (in which case it is more difficult for the user to accurately hit a desired key).

Additionally, predictive keyboard engine 320 can make certain keys on soft keyboard 308 invalid. Thus, predictive keyboard engine 320 does not indicate an invalid key was intended to be selected with a particular user input regardless of what that particular user input is. For example, if the "!" symbol is determined to be invalid, then predictive keyboard engine 320 does not indicate that the "!" symbol was intended to be selected with a particular user input regardless of what that particular user input is.

Predictive keyboard engine 320 can determine how to change the layout and/or alphanumeric characters or symbols corresponding to the keys of soft keyboard 308, and/or determine which key a user intended to select with a particular user input in a variety of different manners. In one or more embodiments, predictive keyboard engine 320 is a learning system that is trained with various inputs (combinations of user input 310 and various different information describing the current input environment). This training involves providing engine 320 with the various inputs and the correct answer so that engine 320 can learn what answers should be given in response to the various inputs. An initial training is typically performed by the designers of predictive keyboard engine 320, and additional training can be performed during operation of system 300. This additional training can be performed, for example, based on feedback given to engine 320 indicating whether a particular output 340 was the correct output. Any of a variety of different learning systems can be used including artificial intelligence systems and other statistical-based systems. For example, such learning systems can include an artificial neural network, Bayesian inference system, k-nearest neighbor algorithm, and so forth.

Alternatively, predictive keyboard engine 320 can be implemented as other systems. For example, engine 320 can be implemented using any of a variety of statistical analysis systems to evaluate the user input 310 and the various different information describing the current input environment. By way of another example, engine 320 could be implemented using various other rules, criteria, or weightings applied to the user input 310 and the various different information describing the current input environment.

Thus, it can be seen that soft keyboard 308 is dynamic. In one or more embodiments soft keyboard 308 changes layouts and/or alphanumeric characters or symbols corresponding to the keys, resulting in a dynamic soft keyboard. Additionally, in one or more embodiments which key a user intended to select with a particular user input can change, resulting in a dynamic soft keyboard. Such changes regarding which key a user intended to select with a particular user input can be made with or without displaying an indication of such changes to the user.

Figure 4:
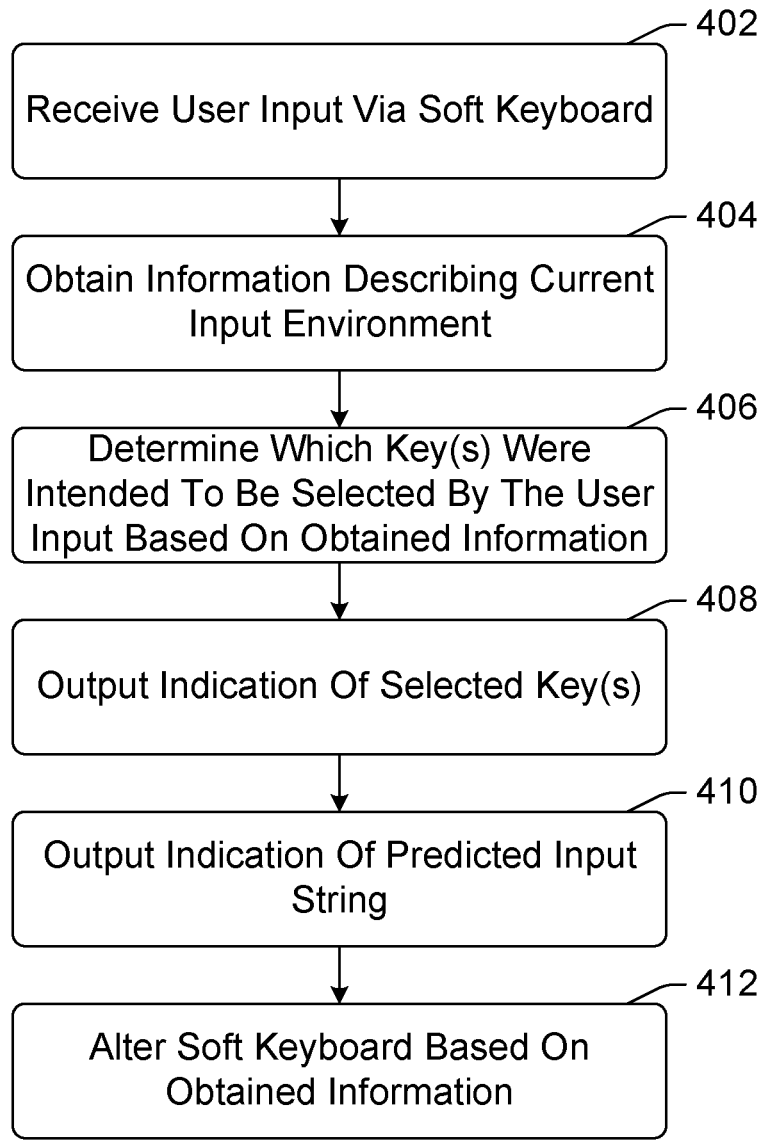
FIG. 4 is a flowchart illustrating an example process for a dynamic soft keyboard in accordance with one or more embodiments.

FIG. 4 is a flowchart illustrating an example process 400 for a dynamic soft keyboard in accordance with one or more embodiments. Process 400 is carried out by a system, such as system 300 of FIG. 3, and can be implemented in software, firmware, hardware, or combinations thereof. Process 400 is shown as a set of acts that specify operations performed by one or more devices and are not necessarily limited to the orders shown for performing the operations by the respective acts. Process 400 is an example process for a dynamic soft keyboard; additional discussions of the dynamic soft keyboard are included herein with reference to other Figures.

Initially, a user input is received via a soft keyboard (act 402). This user input is a particular one or more locations of a soft keyboard as discussed above. Additionally, information describing a current input environment is obtained (act 404). This information can be any of a variety of different types of information, such as the information discussed above with reference to modules 322-332 of FIG. 3.

A particular one or more keys that were intended to be selected by the user input are determined (act 406) based at least in part on the information obtained in act 404. An indication of the one or more keys that were determined to be selected by the user is output (act 408). An indication of a predicted input string is also optionally output (act 410). Additionally, in one or more embodiments the soft keyboard is altered (act 412) based at least in part on the information obtained in act 404. This altering can be, for example, changing the layout and/or changing the alphanumeric characters or symbols corresponding to the keys of the soft keyboard as discussed above.

Figure 5:
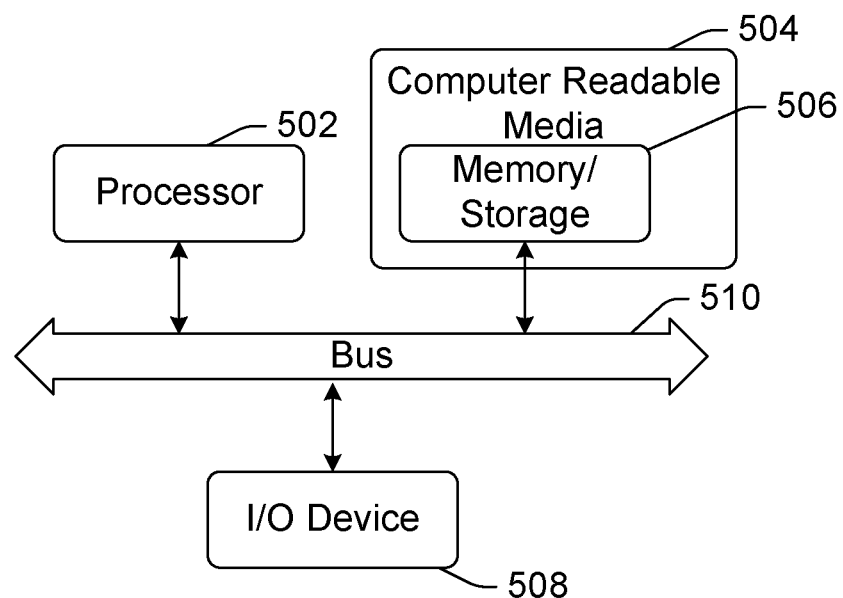
FIG. 5 illustrates an example computing device that can be configured to implement the dynamic soft keyboard in accordance with one or more embodiments.

FIG. 5 illustrates an example computing device 500 that can be configured to implement the dynamic soft keyboard in accordance with one or more embodiments. Computing device 500 can be, for example, computing device 100 of FIG. 1.

Computing device 500 includes one or more processors or processing units 502, one or more computer readable media 504 which can include one or more memory and/or storage components 506, one or more input/output (I/O) devices 508 via which user input 110 of FIG. 1 (or user input 310 of FIG. 3) are received, and a bus 510 that allows the various components and devices to communicate with one another. Computer readable media 504 and/or I/O device(s) 508 can be included as part of, or alternatively may be coupled to, computing device 500. Bus 510 represents one or more of any of several types of bus structures, including a memory bus or memory controller, a peripheral bus, an accelerated graphics port, and a processor or local bus using any of a variety of bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit(s) 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allow information to be presented to the user and/or other components or devices. This information presented to the user can include soft keyboard 108 of FIG. 1 or soft keyboard 308 of FIG. 3. Examples of input devices include a keyboard, a cursor or pointer control device (e.g., a mouse, a trackpad, a thumbstick, a pen tablet, etc.), a microphone, a scanner, a touchscreen, a touchpad, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module," "functionality," and "logic" as used herein generally represent software, firmware, hardware, or combinations thereof. In the case of a software implementation, the module, functionality, or logic represents program code that performs specified tasks when executed on a processor (e.g., CPU or CPUs). The program code can be stored in one or more computer readable memory devices, further description of which may be found with reference to FIG. 5. The features of the dynamic soft keyboard techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   displaying a soft keyboard within a user interface (UI) on a screen of a device with:
      a first key having a display boundary that remains constant but with an associated first hit target that changes, and
      a second key that is adjacent to the first key, the second key having a display boundary that remains constant but with an associated second hit target that changes;
   identifying a grammar type of a first word entered on the UI by a user;
   predicting a second word having a different grammar type than the grammar type of the first word; and
   extending the first hit target of the first key based on the predicted second word, wherein extending the first hit target comprises increasing a size of the first hit target such that the first hit target extends over at least a portion of the display boundary of the second key, and wherein extending the first hit target comprises decreasing a size of the second hit target of the second key.

2. The method of claim 1, further comprising receiving a user input within the UI, wherein the user input comprises a coordinate indicating a location of the soft keyboard selected by the user.

3. The method of claim 1, further comprising:
   identifying a three-dimensional position of a stylus or finger, wherein the three-dimensional position comprises a position in X, Y, and Z coordinates relative to the screen.

4. The method of claim 1, further comprising identifying a three-dimensional position of a stylus or finger, wherein the three-dimensional position comprises x and y positions on the screen and a z position extending away from the screen.

5. The method of claim 4, further comprising:
   receiving a stream of data comprising X-Y-Z coordinates associated with the stylus; and
   detecting a hover of the stylus or finger from the stream of X-Y-Z coordinates.

6. The method of claim 1, wherein the grammar type comprises a noun, verb, or adjective.

7. The method of claim 1, wherein said prediction comprises computing n-gram statistics to identify the second word.

8. The method of claim 1, wherein the first hit target of the first key includes a location in which the first key is displayed and a location in which the second key in the soft keyboard is displayed.

9. The method of claim 1, further comprising extending the first hit target based on the second key that a stylus or finger hovered over in addition to the identified grammar type.

10. The method of claim 1, wherein the device comprises one or more of a television, a wireless phone, a digital camera, a game console, an automotive computer.

11. A system, comprising:
memory embodied with instructions for presenting and dynamically modifying a soft keyboard; and
a processor configured execute the instructions for:
- displaying the soft keyboard within a user interface (UI) on a screen of a device with:
  - a first key having a display boundary that remains constant but with an associated first hit target that changes, and
  - a second key that is adjacent to the first key, the second key having a display boundary that remains constant but with an associated second hit target that changes;
- identifying a grammar type of a first word entered on the UI by a user;
- predicting a second word having a different grammar type than the grammar type of the first word; and
- extending the first hit target based on, in addition to the identified grammar type, a stylus or finger having hovered over the second key, wherein extending the first hit target comprises increasing a size of the first hit target and decreasing a size of the second hit target of the second key.

12. The system of claim 11, wherein the hit target of the first key includes a location in which the first key is displayed and a location in which the second key in the soft keyboard is displayed.

13. The system of claim 11, wherein the instructions are further executable for:
identifying a three-dimensional position of a stylus, wherein the three-dimensional position comprises x and y positions on the screen and a z position extending away from the screen.

14. The system of claim 11, wherein a hover is detected through identifying a Z coordinate of a stylus, the Z coordinate indicative of a distance the stylus is detected away from the screen.

15. The system of claim 14, wherein the grammar type comprises a noun, verb, or adjective.

16. The system of claim 11, wherein the instructions are further executable for:
receiving a stream data comprising one or more of an incoming trajectory, a pen-down trajectory, an outgoing trajectory associated with a stylus; and
detecting a hover of the stylus from the stream data.

17. The system of claim 11, further comprising changing a layout of the soft keyboard.

18. A computer hardware memory device embodied with executable instructions that, when executed by a processor, cause the processor to perform operations, comprising:
displaying a soft keyboard within a user interface (UI) on a screen of a device with:
- a first key having a display boundary that remains constant but with an associated hit target that changes, and
- a second key that is adjacent to the first key, the second key having a display boundary that remains constant;
identifying a grammar type of a first word entered on the UI by a user;
predicting a second word having a different grammar type than the grammar type of the first word; and
increasing the hit target of the first key based on the predicted second word such that the hit target extends over at least a portion of the display boundary of the second key of the soft keyboard.

19. The computer hardware memory device of claim 18, further comprising changing a layout of the soft keyboard between a QWERTY layout and a numeric pad layout based, at least in part, on a type of data that is valid for a UI field receiving user input.

20. The computer hardware memory device of claim 18, further comprising extending the hit target of the first key based on, in addition to the identified grammar type, at least one of the second key or another key that a stylus or finger hovered over.

* * * * *